July 29, 1958 W. H. LYON 2,845,495

LONG PLAYING TAPE RECORDING APPARATUS

Filed Jan. 27, 1954 4 Sheets-Sheet 1

INVENTOR.
WILLIAM H. LYON
BY
H. G. Manning
ATTORNEY

LONG PLAYING TAPE RECORDING APPARATUS

Filed Jan. 27, 1954 4 Sheets-Sheet 2

INVENTOR.
WILLIAM H. LYON
BY
H. G. Manning
ATTORNEY

INVENTOR.
WILLIAM H. LYON
BY
H. G. Manning
ATTORNEY

LONG PLAYING TAPE RECORDING APPARATUS

Filed Jan. 27, 1954 4 Sheets-Sheet 4

INVENTOR.
WILLIAM H. LYON
BY
H. G. Manning
ATTORNEY 2,845,495
Patented July 29, 1958

2,845,495

LONG PLAYING TAPE RECORDING APPARATUS

William H. Lyon, Orange, Conn., assignor to The Soundscriber Corporation, New Haven, Conn., a corporation of Connecticut Application January 27, 1954, Serial No. 406,517
9 Claims. (Cl. 179—100.2)

This invention relates to sound recording and reproducing apparatus, and more particularly to a long playing apparatus in which the sound is recorded on a wide slowly moving flexible strip of tape coated on one side with an emulsion of magnetic particles.

One object of the present invention is to provide a recording and reproducing apparatus of the above nature wherein a series of interrupted successive straight sound tracks may be impressed laterally across the moving tape by means of a plurality of electro-magnetic transducer heads mounted on a rotating drum located on a horizontal axis beneath said tape.

A further object is to provide an apparatus of the above nature which will be simple in construction, inexpensive to manufacture, easy to install and manipulate, compact, ornamental in appearance and very efficient and durable in use.

With these and other objects in view, there has been illustrated on the accompanying drawings, one form in which the invention may conveniently be embodied in practice.

Figure 1:
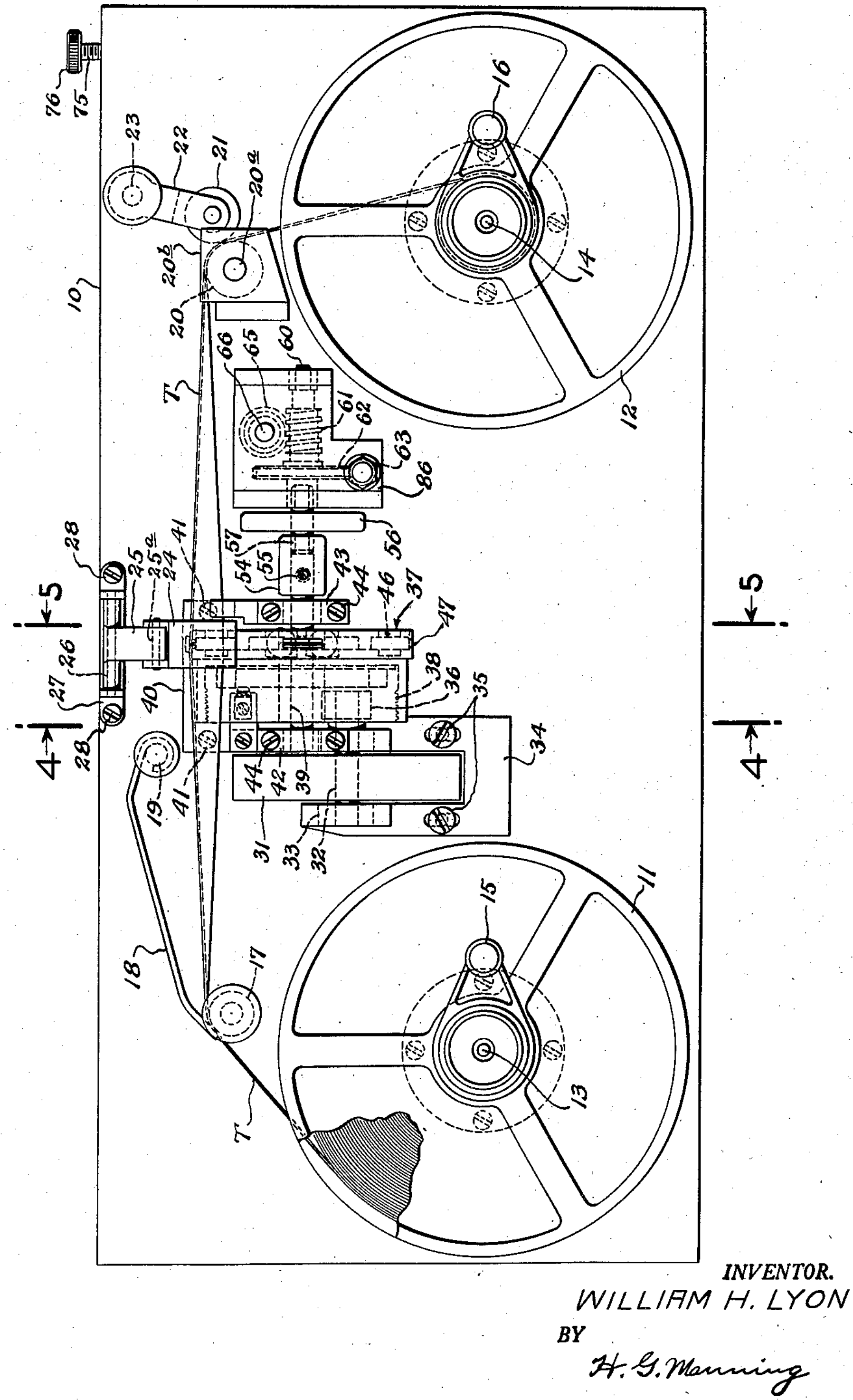
Fig. 1 represents a front view of a magnetic recording mechanism embodying the invention.

The present invention relates to an improvement over the invention disclosed in the co-pending application of Lincoln Thompson, Frank E. Runge and William H. Lyon, Serial No. 255,184, filed November 7, 1951, entitled Long Playing Magnetic Tape Recorder.

The sound tracks are adapted to be generated on the tape by four uniformly spaced transducer heads which project through the outer rim of a rotating drum, mounted on a horizontal axis beneath said tape.

The size of the drum is such that when one head is just leaving one edge of the tape, another head will be just reaching the other edge of the tape.

By means of the concave holding shoe, the tape will be curved to closely embrace the tips of the transducer heads on the cylindrical drum.

Referring now to the drawings in which like reference numerals denote corresponding parts throughout the several views, the numeral 10 indicates a vertical chassis base plate on which the apparatus is mounted, provision being made of a feed reel 11 mounted on the left hand side of said base plate which will hold up to twenty-four hours of wide recording tape T, coated on one side with an emulsion of magnetic particles. A take up reel 12 of the same size as the feed reel 11 is located on the right hand side of the base plate 10.

The feed reel 11 is secured on a horizontal spindle 13 by means of a crank handle 15, while the take up reel 12 is held securely on the spindle 14 by a crank handle 16.

After the tape T leaves the feed reel 11, it will pass over a tape guide drum 17 against which it is pressed by a tape tension shoe 18, pivoted on a pin 19.

The tape T then passes through the recording part of the apparatus over a drive roller 20 mounted on a shaft **20*a* supported by a bracket 20*b***.

The tape T is held in firm contact with the drive roller 20 by means of a pressure roller 21, which is mounted on an arm 22 which swings on a pivot 23.

At an intermediate point between the guide drum 17 and the drive roller 20, the tape is caused to curve transversely over the periphery of a cylindrical revolving hollow head holding drum 37 by means of a tape holding shoe 24 mounted on an arm 25, pivoted on a pin **25*a*, which arm is mounted on a bracket 27 by a pivot pin 26 secured to the base plate 10 by screws 28**.

Figures 4, 5, 6:
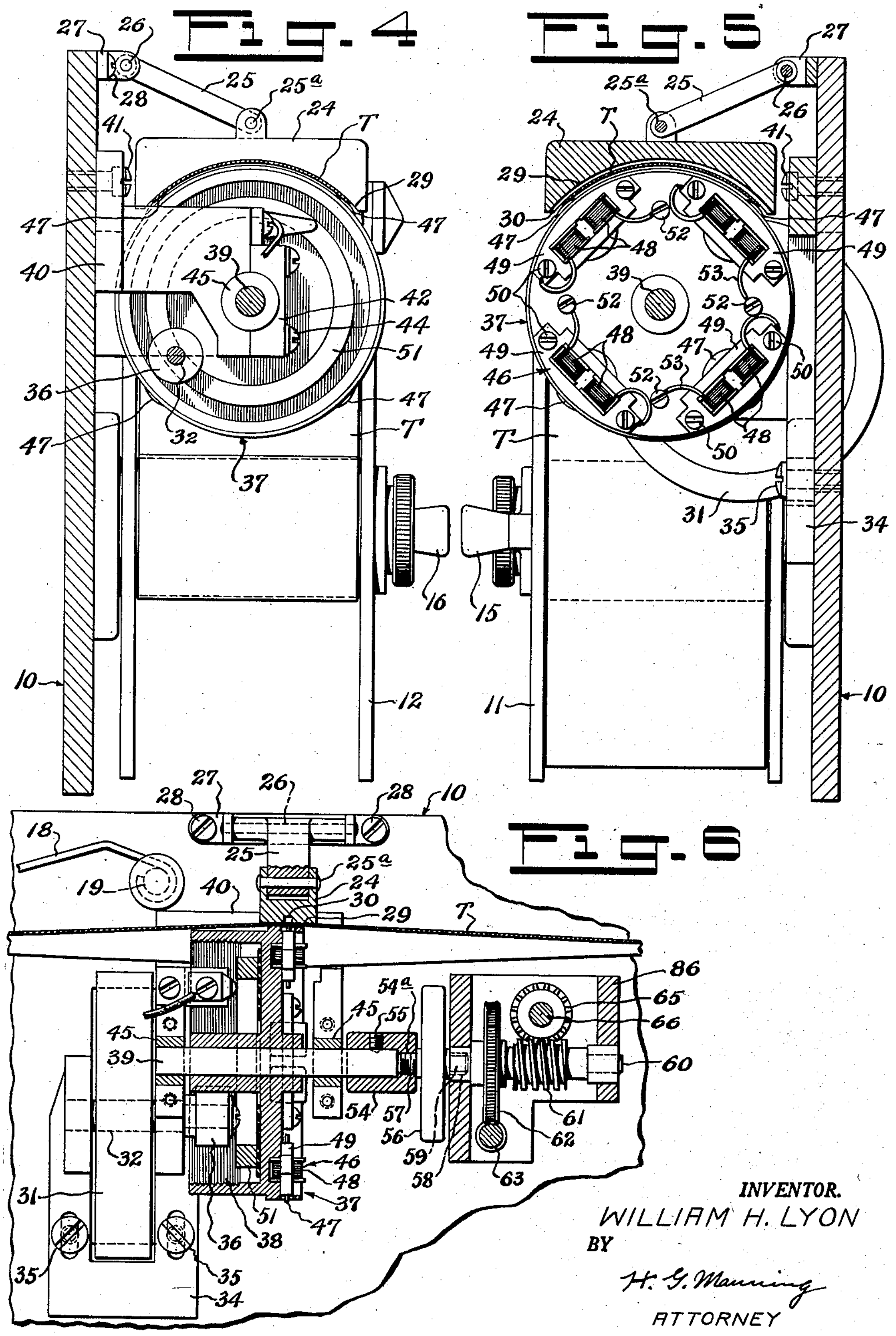
Fig. 4 is a cross sectional view, taken along the line 4—4 of Fig. 1, looking in the direction of the arrows, and showing the recording head drum, the slip ring and the tape holding shoe.
Fig. 5 is a cross sectional view, taken along the line 5—5 of Fig. 1, showing the recording head drum and the transducer heads mounted thereon.
Fig. 6 is a longitudinal sectional view of a portion of the apparatus showing the drum and gear box.

The tape holding shoe 24 is provided with a concave bottom recess 29 the radius of which is the same as the radius of the outside edge of the tape when it is fitted closely to the periphery of the revolving head drum 37. The recess 29 of the tape holding shoe 24 is provided with a tape guiding groove 30 (Fig. 6) of rectangular cross section, which is in alignment with the transducer heads 46 mounted on the drum 37 whereby an air gap is provided above said heads.

The groove 30 permits the tape T to flex around the tips of the heads 46 and thereby produces intimate curved contact therewith.

The head holding drum 37 is stabilized by a flywheel 31 which runs several times as fast as the speed of said drum. The flywheel is mounted on a shaft 32 which revolves in ball bearings 33 supported by a U-bracket 34 which is secured to the base plate 10 by screws 35.

On the end of the shaft 32 provision is made of a soft rubber wheel 36 which contacts the inner rim of the revolving head holding drum 37 for filtering out flutter and driving gear disturbances.

The inner surface of the rim of said drum 37 is provided with helical grooves 38 to provide good contact with the rubber wheel 36 in case said wheel may have fl spots.

The head holding drum 37 is mounted on a shaft 39 revolving in oilite bearings 45 in a bracket 40 secured to the base plate 10 by screws 41.

A pair of split blocks 42, 43 are secured by screws 44 to the bracket 40 in order to clamp tightly upon the bearing 45.

Four transducer heads 46 are spaced uniformly around the outer housing rim of the head drum 37, each head consisting of a core 47 and a pair of coils 48, the coils of all four heads being electrically connected in parallel by means of conductors 53.

A heavy brass housing 49 embraces the cores 47 and coils 48 of the transducer heads and serves to maintain the heads 46 in proper alignment with each other. The heads 46 are secured to the body of the drum 37 by screws 50.

A slip ring 51 is also secured to the body of the head holding drum 37 by screws 52 (Fig. 5) and is electrically connected to each of the head coils 48, the other sides of said coils being connected to the ground.

One end of the head holding drum shaft 39 is provided with a collar 54 (Fig. 6) which is held in place by a set screw 55, and the end of the collar 54 has a tapped hole **54*a* for receiving the threaded end 57 of a flexible coupling 56**.

The other end of the flexible coupling 56 comprises a screw 59 which fits into a tapped hole 58 of a worm shaft 60.

The worm shaft 60 is adapted to be driven by a fiber gear 62 which is in mesh with a high speed worm and shaft 63 connected by means of a flexible tubular coupling 64 to a motor M.

The worm shaft 60 is provided with a worm 61 meshing with a worm gear 65 which is attached to a shaft 66 projecting from the rear of the base plate 10, where it supports a gear 67, the latter serving to drive the feed roller 20 through an idler gear 68 and a gear 69 mounted on the shaft **20*a*, one end of which carries a pulley 70 which drives the take up reel 12 by means of a belt 71 and a larger pulley 72. The motor M is mounted in a U-shaped bracket 73, by means of bolts 73*a***.

The belt 71 preferably comprises a coil spring which is adapted to slip frictionally on the pulleys 70 and 72 to prevent overdriving the tape T.

The train of gears 67, 68, 69 are mounted on an elongated plate 74 which is pivoted on the shaft **20*a* in such a manner that when said plate 74 is rotated, the gear 68 will change its relative angular position with respect to the gears 67 and 69**.

By means of this construction, the angular relationship between the feed roller 20 and the driving gear 67 may be readily adjusted.

Thus, when reproducing a signal, the tape T can easily be aligned longitudinally with great accuracy with respect to the heads 46 for proper playback, by a slight manual rotational movement of the mounting plate 74 around the axis of the shaft **20*a***.

This rotational movement may be accomplished by means of a screw 75 having a knurled handle 76 mounted in a tapped block 78.

The other end of the screw 75 engages a block 79 and is pressed against it by a tension spring 77 which is connected to both of said blocks 78 and 79 by means of screws **78*a* and 79*a***.

Figures 3, 7:
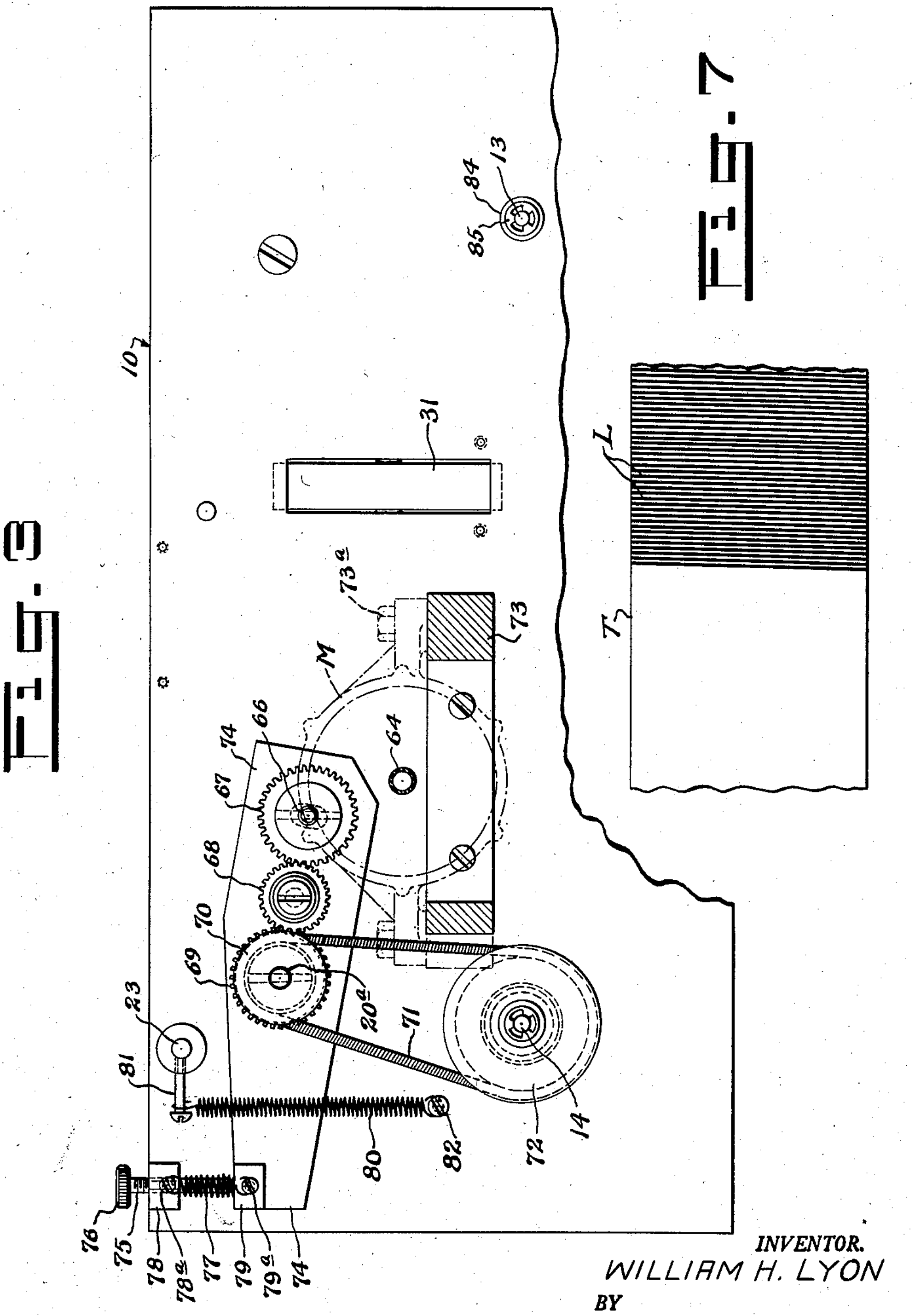
Fig. 3 is a rear view of the same.
Fig. 7 is a plan view of a portion of the magnetic tape showing the location of the transverse straight sound tracks recorded thereon.

The shaft 23 of the pressure roller 21 has an arm 81, (Fig. 3) connected to an elongated coiled spring 80 which is anchored to a screw 82 on the base plate 10 to provide the necessary pressure for the roller 21.

Figure 2:
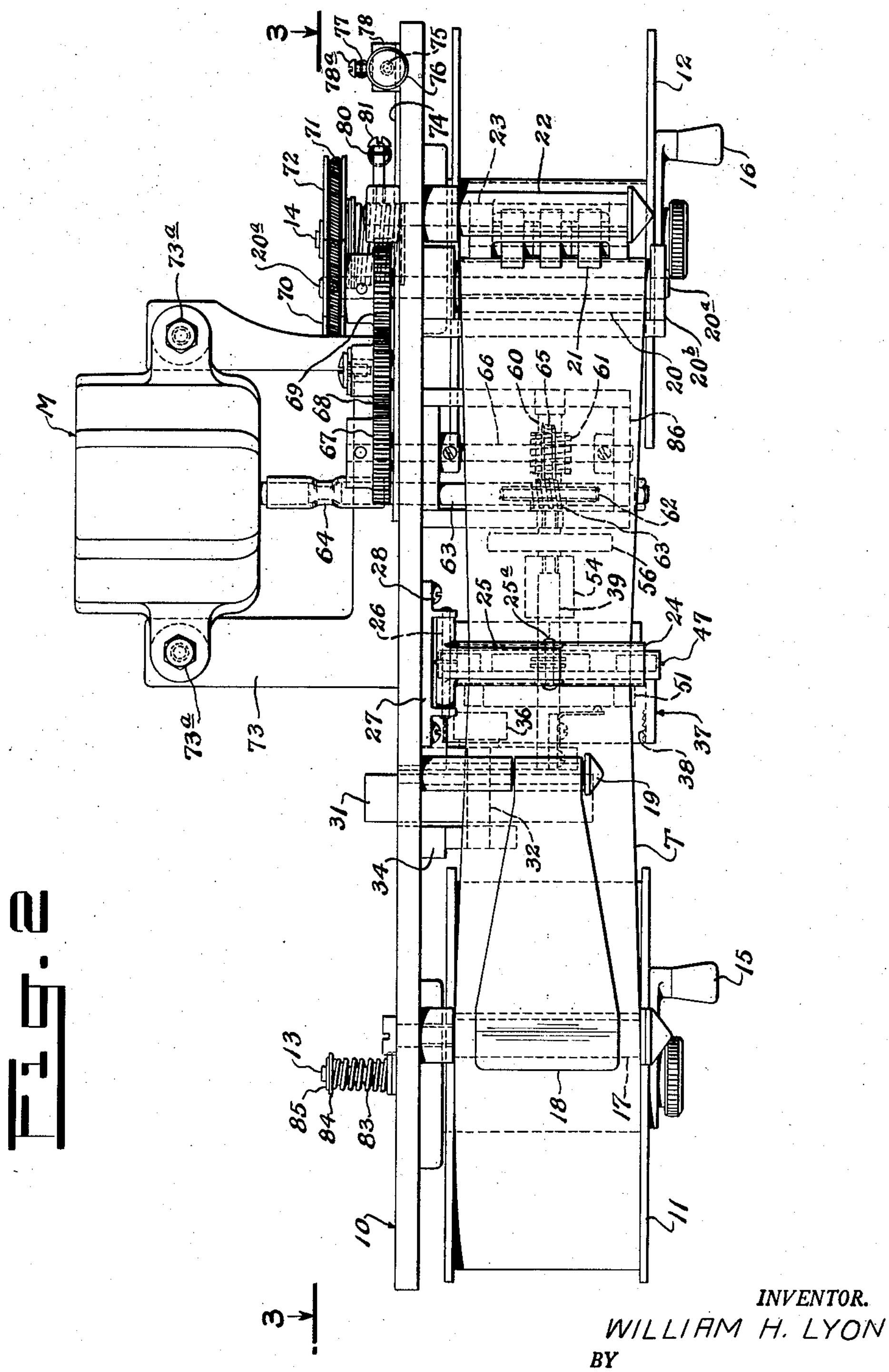
Fig. 2 is a top plan view of the same.

A spring 83 (Fig. 2) is provided on the shaft 13 of the feed reel 11, and is held in place by washers 84 and 85 in order to serve as a brake for said feed reel 11.

*Operation*

In loading the tape, it will first be threaded over the drum 17 and under the tension shoe 18, thence over the drum 37 and under the tape holding shoe 24, from which it passes over the drive roller 20 under the pressure roller 21 to the take up reel 12.

*Advantages*

One of the most important advantages of the present invention is that the transverse alignment of the tape with respect to the heads is not critical.

With the interrupted arcuate tracks of the former type of magnetic recorder, it was necessary that the tape be adjusted to very close tolerances to match the recorded tracks with the reproducing heads during playback.

A further advantage is that the bearings which support the drum do not have to be precise and tight, and only a single thrust bearing is necessary to hold the transducer heads in a constant plane for recording or playback to obtain lateral precision on the tracks of the tape.

A further advantage of the transverse type of recording apparatus herein disclosed, is that the space between the tracks may be reduced so that more material may be recorded on a given length of tape at a given recording speed.

While there has been disclosed in this specification one form in which the invention may be embodied, it is to be understood that this form is shown for the purpose of illustration only and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an apparatus for recording upon and reproducing intelligence from a flexible magnetic tape, the combination comprising a mounting chassis, a tape feed reel supporting a roll of magnetic tape mounted on one end of said chassis, a tape take-up reel mounted on the other end of said chassis, drive mechanism for passing said tape from said tape feed reel to said tape take-up reel, a cylindrical drum rotatably mounted with respect to said chassis and having its axis of rotation fixed with respect to said chassis and parallel to the directional path of said tape passage, a plurality of transducer heads equidistantly spaced about and protruding from the peripheral wall of said cylindrical drum, said drive mechanism comprising means to rotate said cylindrical drum in timed relation with respect to the lateral passage of said tape, said cylindrical drum being so located with respect to said tape that said transducer heads successively contact said tape to produce substantially parallel transverse tracks thereon, a rotatably mounted flywheel, speed reduction mechanism interconnecting said flywheel and said drive mechanism for cooperative action wherein said flywheel will be rotated at a greater angular velocity than the velocity of said drum for filtering out mechanical flutter in said drum, and an arcuate gravity-operated holding shoe operative to press said tape against the periphery of said cylindrical drum for maintaining said tape in intimate contact with said protruding transducer heads.

2. The invention as defined in claim 1, in which said tape holding shoe is provided with a curved under surface having a narrow longitudinal groove in alignment with the path of said heads to permit said tape to flex about said heads.

3. In an apparatus for recording upon and reproducing intelligence from a flexible magnetic tape, the combination comprising a mounting chassis, a tape feed reel supporting a roll of magnetic tape mounted on one end of said chassis, a tape take-up reel mounted on the other end of said chassis, drive mechanism for passing said tape from said tape feed reel to said tape take-up reel, a hollow cylindrical drum rotatably mounted with respect to said chassis and having its axis of rotation fixed with respect to said chassis and parallel to the directional path of said tape passage, a plurality of transducer heads equidistantly spaced about and protruding from the peripheral wall of said cylindrical drum, said drive mechanism comprising means to rotate said cylindrical drum in timed relation with respect to the lateral passage of said tape, said cylindrical drum being so located with respect to said tape that said transducer heads will successively contact said tape to produce substantially parallel transverse tracks thereon, an arcuate gravity-operated holding shoe operative to press said tape against the periphery of said cylindrical drum for maintaining said tape in intimate contact with said protruding transducer heads, and a flywheel mounted on a shaft having a soft rubber wheel which engages the inside rim of said drum for stabilizing it and filtering out flutter and disturbances in the driving mechanism.

4. The invention as defined in claim 3, in which the inside of said drum is provided with helical grooves for engaging said wheel.

5. The invention as defined in claim 1, in which said drum is provided with an interior circular slip ring for connecting the coils of said transducer heads in parallel to an amplifier.

6. In an apparatus for recording upon and reproducing intelligence from a flexible magnetic tape, the combination comprising a mounting chassis, a tape feed reel supporting a roll of magnetic tape mounted on one end of said chassis, a tape take-up reel mounted on the other end of said chassis, drive mechanism for passing said tape from said tape feed reel to said tape take-up reel, a cylindrical drum rotatably mounted with respect to said chassis and having its axis of rotation fixed with respect to said chassis and parallel to the directional path of said tape passage, a plurality of transducer heads equidistantly spaced about and protruding from the peripheral wall of said cylindrical drum, said drive mechanism comprising means to rotate said cylindrical drum in timed relation with respect to the lateral passage of said tape, said cylindrical drum being so located with respect to said tape that said transducer heads will successively contact said tape to produce substantially parallel transverse tracks thereon, an arcuate gravity-operated holding shoe operative to press said tape against the periphery of said cylindrical drum for maintaining said tape in intimate contact with said protruding transducer heads, and a train of gears for laterally adjusting said tape with respect to said heads, said train of gears being mounted upon a swingable plate having manually controlled adjustment means to vary the angular position thereof.

7. In an apparatus for recording upon and reproducing intelligence from a wide flexible magnetic tape, the combination comprising a tape feed reel supporting a roll of magnetic tape, a tape take-up reel, drive mechanism for passing said tape from said tape feed reel to said take-up reel, a longitudinal shaft having its axis of rotation located parallel to the directional path of said tape passage, a cylindrical drum mounted on said shaft and having a plurality of transducer heads equidistantly spaced about and protruding from the peripheral wall of said cylindrical drum, said drive mechanism including means to rotate said cylindrical drum in timed relation with respect to the passage of said tape, said cylindrical drum being so located with respect to said tape that said transducer heads will successively contact said tape to produce parallel transverse tracks thereon substantially at right angles to the direction of movement of said tape, arcuate holding means to resiliently press said tape against the periphery of said cylindrical drum for maintaining said tape in intimate contact with said protruding transducer heads, and flywheel means connected with said shaft for filtering out wow, flutter, and other mechanical disturbances in the driving mechanism.

8. In an apparatus for recording upon and reproducing intelligence from a wide flexible magnetic tape, the combination comprising a mounting chassis, a tape feed reel supporting a roll of magnetic tape mounted on one end of said chassis, a tape take-up reel mounted on the other end of said chassis, drive mechanism for passing said tape from said feed reel to said take-up reel, a constantly driven shaft having its axis of rotation parallel to the directional path of said tape passage, a cylindrical drum mounted upon said shaft and having a plurality of transducer heads equally spaced about and protruding from the wall of said drum, said cylindrical drum being so located with respect to said tape that said transducer heads will successively contact said tape to produce substantially parallel transverse tracks thereon, arcuate holding means operative to press said tape against the periphery of said drum for maintaining said tape in intimate contact with said protruding transducer heads, means for longitudinally adjusting said tape with respect to said heads during reproduction to synchronize said heads with the tracks recorded on said tape, and flywheel means connected with said shaft for filtering out wow, flutter, and other mechanical disturbances in the driving mechanism.

9. In an apparatus for recording upon and reproducing intelligence from a wide flexible magnetic tape, the combination comprising a mounting chassis, a tape feed reel supporting a roll of magnetic tape mounted on one end of said chassis, a tape take-up reel mounted on the other end of said chassis, drive mechanism for passing said tape from said feed reel to said take-up reel, a constantly driven longitudinally extending shaft mounted on said chassis parallel to the directional path of said tape passage, a cylindrical drum mounted on said shaft to rotate at right angles to the movement of said tape, said drum having a plurality of protruding transducer heads equidistantly spaced about the periphery thereof, said drive mechanism comprising means to rotate said shaft and drum in timed relation with respect to the passage of said tape, said cylindrical drum being so located with respect to said tape that said transducer heads will successively contact said tape to produce substantially parallel transverse tracks thereon, arcuate means operative to press said tape against the periphery of said cylindrical drum for maintaining said tape in intimate contact with said protruding transducer heads, and flywheel means connected with said shaft for filtering out wow, flutter, and other mechanical disturbances in the driving mechanism.

References Cited in the file of this patent

UNITED STATES PATENTS

| | | |
|---|---|---|
| 2,245,286 | Marzocchi | June 10, 1941 |
| 2,648,589 | Hickman | Aug. 11, 1953 |

OTHER REFERENCES

Begun: Magnetic Recording, 1949, page 119.